United States Patent [19]
Shinomura

[11] 3,888,810

[45] June 10, 1975

[54] THERMOPLASTIC RESIN COMPOSITION INCLUDING WOOD AND FIBROUS MATERIALS

[75] Inventor: Toshihiko Shinomura, Kawasaki, Japan

[73] Assignee: Nippon Oil Co., Ltd., Tokyo, Japan

[22] Filed: July 9, 1973

[21] Appl. No.: 377,711

[30] Foreign Application Priority Data
July 11, 1972  Japan.................................. 47-69222

[52] U.S. Cl. 260/17.4 BB; 260/17.4 R; 260/17.4 CL
[51] Int. Cl............................................. C08g 45/18
[58] Field of Search. 260/17.4 R, 17.4 CL, 17.4 BB, 260/9, 41 R, 41 A, 41 C, 41 AG

[56] References Cited
UNITED STATES PATENTS

| | | | |
|---|---|---|---|
| 2,635,976 | 4/1953 | Meiler et al. | 260/17.4 |
| 2,663,693 | 12/1953 | Hess et al. | 260/4 |
| 3,474,048 | 10/1969 | Chappe Lear et al. | 260/2.5 |
| 3,709,845 | 1/1973 | Boustany et al. | 260/17.4 |

*Primary Examiner*—Melvin Goldstein
*Assistant Examiner*—Edward Woodberry
*Attorney, Agent, or Firm*—Frank J. Jordan

[57] ABSTRACT

A thermoplastic resin composition is disclosed for use as structural, packing and other industrial materials. The composition essentially comprises thermoplastic resins, wood materials, synthetic, inorganic or regenerated fibrous materials and preferably synthetic or natural rubbery materials.

3 Claims, No Drawings

THERMOPLASTIC RESIN COMPOSITION INCLUDING WOOD AND FIBROUS MATERIALS

BACKGROUND OF THE INVENTION

This invention relates to thermoplastic resin compositions suitable for use as structural materials, packing materials and so on, and more particularly to thermoplastic resin compositions comprising predetermined amounts of starting resins, dry wood materials, synthetic or inorganic fibrous materials and preferably rubbery materials.

There have been hitherto proposed several wood-like materials consisting mainly of synthetic high polymers or the so-called "synthetic wood" as contrasted to naturally-occuring wood. Typical examples are foamed synthetic resins, synthetic resins added with minute hollow elements, hydrous polyesters, synthetic resins filled with pigments and the like. Some of them have found commercial use to some extent, but most of them are not entirely satisfactory because of their low mechanical strength, elasticity and machinability essential to wood materials. Another disadvantage of these prior-art materials is that they are difficult to be discarded or regenerated and further that their manufacturing costs are prohibitive.

On the other hand natural wood resources have been increasingly diminishing, and labour costs for logging and machining the wood and timber have been raised tremendously. The treating of waste materials of wood such as bark-dust, saw-dust and wastes from paper-mills produces a large social problem.

SUMMARY OF THE INVENTION

Whereas, it is an object of the present invention to provide at relatively low cost improved thermoplastic resin compositions of this character which have ideal proportions of many of the desirable properties including mechanical strength, elasticity, nailability, sawability and the like.

Other objects and features of the invention will be apparent from the following description taken in connection with certain preferred embodiments.

Briefly stated, the compositions of the present invention comprise 100 parts by weight of starting thermoplastic resins, 10 – 500 parts preferably 50 – 200 parts by dry weight of waste wood materials such as saw-dust, bark-dust, waste materials produced during the paper making and the like and 2 – 200 parts preferably 10 – 30 parts by weight of synthetic, inorganic or regenerated fibrous materials. According to another aspect of the invention, these may be further added up to 30 parts by weight of natural or synthetic rubbers.

The term thermoplastic resins or the first component as used herein includes polyethylene, polypropylene, polystyrene, polyvinyl chloride, acrylonitrile-styrene-butadiene resin and their copolymers or blends.

The term saw-dust and bark-dust or the second component includes such wood dust of below five mesh available from logging processes. The paper-mill wastes herein referred to collectively embrace waste knots, settler wastes, fine pulp, drainage, cellulosic powder and the like.

The term fibrous materials or the third component includes polyester fiber, polyamide fiber, polyacrylic fiber, glass fiber, asbestos, silica-alumina fiber, rayon and the like.

It has been found that the second component when added in amounts of less than 10 parts by weight will reduce the qualities of sawing, nailing, elasticity and heat insulation. However, amounts of this component in excess of 500 parts by weight are infeasible.

The third composition when added in amounts of less than 2 parts by weight will result in poor mechanical strength and elasticity. But amounts in excess of 100 parts are impracticable.

It has been further found that the wood materials specified herein above will not only serve to reduce the production cost but also improve the sawability, nailability, heat insulation and combustibility. However, simple addition of these wood materials alone to the starting resins will not give appreciable rise to mechanical strength, elasticity, creep resistance or nail pulling resistance. One known method for improving these physical properties is to use the graft polymerization of certain monomers with wood powder. According to the present invention, satisfactory results are obtained by adding synthetic, inorganic or regenerated fibrous materials of the type described.

In accordance with the present invention, it has also been found that synthetic rubber such as styrenebutadiene rubber, butadiene rubber, butyl rubber, acrylonitrile-butadiene rubber (NBR) and ethylene-propylene rubber, or natural rubber may be advantageously used as a thickener in amounts of 30 parts or less, preferably 1 – 20 parts by weight. If necessary, various other additives may be used.

DESCRIPTION OF THE PREFERRED EMBODIMENTS

The following examples are provided to further illustrate the present invention but these are not to be regarded as limiting.

INVENTIVE EXAMPLES I –IV 100 parts by weight high density polyethylene (HDPE) having a melt index of 5.0 and a density of 0.96 was treated at a roll temperature of 160° – 170°C in accordance with the recipe given in Table I. The admixture was fabricated by pressing at 180°C and 200 kg/cm$^2$ into a sheet. Test data of these products are given in Table I wherein Comparative Examples are provided by way of contrast. The products were tested to show high mechanical strength and elasticity, moderately low elongation, excellent sawability and nailability and combustibility comparable to natural wood. The nylon staples used herein were made of nylon 6 of 3 denier having a cut length of 10 mm. The polyester staples used herein were made of polyethylene terephthalate of 2 denier having a cut length of 7 mm. In Inventive Example I a predetermined amount of styrene-butadiene rubber (SBR) was added with good results. Similar results were also obtained by the addition of natural rubber.

INVENTIVE EXAMPLE V 100 parts by weight high density polyethylene (HDPE) having a melt index of 5.0 and a density of 0.96 was admixed as in Table I with a dry blend of cellulosic powder (passable through a 10 mesh filter) and glass fiber (6 mm chopped strands treated with a coupling agent). The admixture was applied to an extruder thereby to fabricate a sheet.

INVENTIVE EXAMPLE VI 100 parts by weight polypropylene (PP) having a melt index of 5.0 was used in accordance with the recipe of Table II and treated at a roll temperature of 180°C. The admixture was fabricated by pressing at 200°C and 200 kg/cm² into a sheet. Test data of this product are given in Table II wherein Comparative Example IV is provided by way of contrast.

INVENTIVE EXAMPLE VII 100 parts by weight polystyrene (PST) was treated as in Table II at a roll temperature of 150° – 160°C. The admixture was fabricated by pressing at 180°C and 200 kg/cm² into a sheet. Test data of this product are given in Table II wherein Comparative Example V is provided by way of contrast.

INVENTIVE EXAMPLE VIII 100 parts by weight polyvinyl chloride (PVC) was blended in accordance with the recipe of Table II at a roll temperature of 190° – 200°C. The admixture was fabricated by pressing at 200°C and 200 kg/cm² into a sheet. Test data of this product are given in Table II wherein Comparative Example VI is provided by way of contrast.

INVENTIVE EXAMPLE IX 100 parts by weight high density polyethylene having a melt index of 5.0 and density of 0.96 was admixed with wood powder and rayon staples in accordance with the recipe given in Table II at a roll temperature of 160° – 170°C. The rayon staples used herein were of 3 denier having a cut length of 10 mm. The admixture was fabricated by pressing at 180°C and 200 kg/cm² into a sheet. Test data of this product are given in Table II.

Table I

|  | Recipe | Bending Modulus *1 (kg/cm²) | Bending Strength *1 (kg/cm²) | Breaking Strength *2 (kg/cm²) | $M_1$ % *3 (kg/cm²) | Breaking Elongation *2 (%) |
|---|---|---|---|---|---|---|
| Comparative Example I | HDPE 100 | $1.16 \times 10^4$ | 174 | 212 (yield point) | 76 | 134 |
| Comparative Example II | HDPE 100, wood powder 100 | $2.19 \times 10^4$ | 148 | 100 | 94 | 1.2 |
| Comparative Example III | HDPE 100, SBR 20, wood powder 300 | $1.95 \times 10^4$ | 124 | 96 | 96 | 1.0 |
| Inventive Example I | HDPE 100, SBR 20, wood powder 400, nylon staples 10 | $3.43 \times 10^4$ | 314 | 248 | 240 | 1.1 |
| Inventive Example II | HDPE 100, wood powder 100, nylon staples 20 | $3.35 \times 10^4$ | 384 | 245 | 232 | 1.3 |
| Inventive Example III | HDPE 100, waste knots 20, polyester staples 70 | $3.74 \times 10^4$ | 443 | 255 | 242 | 1.2 |
| Inventive Example IV | HDPE 100, settler wastes 200, silica-alumina fiber 5 | $2.93 \times 10^4$ | 224 | 192 | 186 | 1.1 |
| Inventive Example V | HDPE 100, cellulosic powder 50, glass fiber 20 | $3.15 \times 10^4$ | 304 | 235 | 195 | 1.4 |

Note:
*1 These values were measured according to ASTMD-790-66.
*2 These values were measured with an example sheet of 50 mm in length, 10 mm in width and 2 mm in thickness at a deformation velocity of 5 mm/min.
*3 These data show stress corresponding to 1% of strain in measuring item *2.

Table II

|  | Recipe | Bending Modulus (kg/cm²) | Bending Strength (kg/cm²) | Breaking Strength (kg/cm²) | $M_1$ % (kg/cm²) | Breaking Elongation (%) |
|---|---|---|---|---|---|---|
| Comparative Example IV | PP 100, wood powder 100 | $1.85 \times 10^4$ | 172 | 114 | 102 | 1.3 |
| Comparative Example V | PST 100, wood powder 100 | $2.75 \times 10^4$ | 244 | 122 | 122 | 1.0 |
| Comparative Example VI | PVC 100, stearic acid 1, butyl stearate 1, wood powder 100, *4 DBTM 3.5, *5 DBTL 0.1 | $2.92 \times 10^4$ | 314 | 135 | 112 | 1.2 |
| Inventive Example VI | PP 100, wood powder 100, polyester staples 15 | $3.25 \times 10^4$ | 335 | 235 | 210 | 1.4 |
| Inventive Example VII | PST 100, wood powder 100 nylon 20 | $4.81 \times 10^4$ | 484 | 259 | 234 | 1.2 |
| Inventive Example VIII | PVC 100, stearic acid 1, butyl stearate 1, wood powder 100, *4 DBTM 3.5, *5 DBTL 0.1, polyester staples 10 | $5.26 \times 10^4$ | 643 | 281 | 212 | 1.6 |
| Inventive Example IX | HDPE 100, wood powder 100 rayon staples 20 | $3.05 \times 10^4$ | 328 | 212 | 197 | 1.1 |

Note:
*4 DBTM is a stabilizer of tin maleate.
*5 DBTL is a stabilizer of tin laurate.

What is claimed is:

1. A thermoplastic resin composition comprising 100 parts by weight of one or more thermoplastic resins selected from the group consisting of polyethylene, polypropylene, polystyrene, polyvinyl chloride and acrylonitrile-styrenebutadiene resin; 10 – 500 parts by dry weight of one or more wood materials selected from the group consisting of saw-dust, bark-dust and papermill wastes; and 2 – 100 parts by weight of fibrous materials selected from the group consisting of polyester fiber, polyamide fiber, polyacrylic fiber, glass fiber, silica-alumina fiber and rayon.

2. The thermoplastic resin composition as defined in claim 1 which further includes up to 30 parts by weight of natural rubber.

3. The thermoplastic resin composition as defined in claim 1 which further includes up to 30 parts by weight of synthetic rubber selected from the group consisting of styrene-butadiene rubber, butadiene rubber, butyl rubber, acrylonitrile-butadiene rubber (NBR) and ethylene-propylene rubber.

* * * * *